(12) United States Patent
Wang

(10) Patent No.: US 8,769,425 B2
(45) Date of Patent: Jul. 1, 2014

(54) METHOD AND APPARATUS FOR DISPLAYING STORAGE DEVICE PARTITION

(71) Applicant: Huawei Technologies Co., Ltd., Guangdong (CN)

(72) Inventor: Shouyu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/081,251

(22) Filed: Nov. 15, 2013

(65) Prior Publication Data

US 2014/0075360 A1 Mar. 13, 2014

Related U.S. Application Data

(63) Continuation of application No. PCT/CN2013/074683, filed on Apr. 25, 2013.

(30) Foreign Application Priority Data

Aug. 22, 2012 (CN) .......................... 2012 1 0301106

(51) Int. Cl.
*G06F 3/048* (2013.01)
(52) U.S. Cl.
USPC .......................................................... 715/771
(58) Field of Classification Search
USPC .................. 715/771, 781, 764; 711/100, 173; 345/156, 530, 544; 707/968, 972
See application file for complete search history.

(56) References Cited

U.S. PATENT DOCUMENTS

| 7,518,607 | B2 * | 4/2009 | Kidera .......................... 345/421 |
| 7,594,063 | B1 * | 9/2009 | Estakhri et al. ................ 711/103 |
| 2003/0208322 | A1 | 11/2003 | Aoki et al. |
| 2008/0288562 | A1 * | 11/2008 | Weir et al. ...................... 707/205 |
| 2009/0094424 | A1 * | 4/2009 | Bondurant et al. ............ 711/161 |
| 2009/0183088 | A1 * | 7/2009 | Saka ............................. 715/751 |
| 2010/0332912 | A1 | 12/2010 | Eide et al. |
| 2011/0052156 | A1 * | 3/2011 | Kuhn ............................. 386/295 |
| 2011/0200254 | A1 * | 8/2011 | Taniguchi et al. ............. 382/173 |

FOREIGN PATENT DOCUMENTS

| CN | 102902499 A | 1/2013 |
| JP | 2007304650 A | 11/2007 |

* cited by examiner

*Primary Examiner* — Rashawn Tillery

(57) ABSTRACT

The present invention relates to the field of information technologies, discloses a method and an apparatus for displaying a storage device partition, which facilitate user operations among storage devices. The method includes: acquiring a partition storage capacity of a storage partition and a total area of a display interface of a storage device, where display interface is used to display storage partition of storage device and name information of storage partition; determining a storage capacity percentage of the partition storage capacity in a total storage capacity of the storage device, dividing display interface into different sub-display areas according to determined storage capacity percentage and a total area of display interface, where different sub-display areas correspond to different storage partitions and are used to display name information of corresponding storage partitions; generating and displaying, a spacing line between adjacent sub-display areas, where all sub-display areas share a same vertex.

16 Claims, 3 Drawing Sheets

METHOD AND APPARATUS FOR DISPLAYING STORAGE DEVICE PARTITION

CROSS-REFERENCE TO RELATED APPLICATIONS

This application is a continuation of International Application No. PCT/CN2013/074683, filed on Apr. 25, 2013, which claims priority to Chinese Patent Application No. 201210301106.6 filed on Aug. 22, 2012, both of which are hereby incorporated by reference in their entireties.

TECHNICAL FIELD

The present invention relates to the field of information technologies, and in particular, to a method and an apparatus for displaying a storage device partition.

BACKGROUND

More and more electronic devices are disposed with storage devices. Once there is a storage device, storage information of each storage device needs to be displayed, such as a capacity, available space, used space, and a stored file of the storage device. As a capacity of a storage device and stored files increase, a storage directory hierarchy increases, and a traditional storage device display technology can no longer meet a requirement.

A common storage device display is shown in FIG. 1, and only a little content of storage information of each storage device is displayed. If a user wants to acquire more storage information, the user needs to perform another operation, which increases an operation amount of the user. In addition, if the user needs to simultaneously operate files stored in multiple storage devices, the user needs to perform more tedious operations. For example, if the user wants to view a file stored in a root directory of a hard disk partition C in a computer, the user needs to click an icon of the partition C to enter another interface to view content stored in the partition C.

SUMMARY

A technical problem to be solved by the present invention is to provide a method and an apparatus for displaying a storage device partition, so as to facilitate user operations among storage devices, simplify user operations, and improve user experience.

To achieve the preceding objectives, embodiments of the present invention adopt the following technical solutions:

A method for displaying a storage device partition is provided and includes:

acquiring a partition storage capacity of a storage partition and a total area of a display interface of a storage device, where the display interface is used to display the storage partition of the storage device and name information of the storage partition;

determining a storage capacity percentage of the partition storage capacity in a total storage capacity of the storage device, and dividing the display interface into different sub-display areas according to the determined storage capacity percentage and the total area of the display interface, where the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and generating and displaying, on the display interface, a spacing line located between adjacent sub-display areas, where all sub-display areas share a same vertex.

An apparatus for displaying a storage device partition is provided and includes:

a capacity and area acquiring unit, configured to acquire a partition storage capacity of a storage partition and a total area of a display interface of a storage device, where the display interface is used to display the storage partition of the storage device and name information of the storage partition;

a display area dividing unit, configured to determine a storage capacity percentage of the partition storage capacity in a total storage capacity of the storage device, and divide the display interface into different sub-display areas according to the determined storage capacity percentage and the total area of the display interface, where the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and a spacing line displaying unit, configured to generate and display, on the display interface, a spacing line located between adjacent sub-display areas, where all sub-display areas share a same vertex.

According to the method and the apparatus for displaying a storage device partition provided in the embodiments of the present invention, a display interface is divided into several display areas, and each display area corresponds to one storage device partition and is used to independently display storage information of a corresponding partition, such as a name, a capacity, available space, and used space of the corresponding partition, and a file and a folder that are in a root directory of the partition. As a result, space of the display interface is fully used, user operations are simplified, user operations among storage partitions are facilitated, and user experience is improved.

DESCRIPTION OF EMBODIMENTS

Embodiments of the present invention provide a method and an apparatus for displaying a storage device partition in an electronic device, which facilitate user operations among storage partitions, simplify user operations, and improve user experience.

The embodiments of the present invention are described in detail in the following with reference to the accompanying drawings. Specific implementation manners to be described are merely used to explain the present invention and are not intended to limit the present invention.

An embodiment of the present invention provides a method for displaying a storage device partition. This method may be applied to a digital product such as a computer, a notebook, a mobile phone, a player, and a camera, and may also be applied to an instrument with storage and display functions, which is not limited in this embodiment of the present invention.

Figure 1:
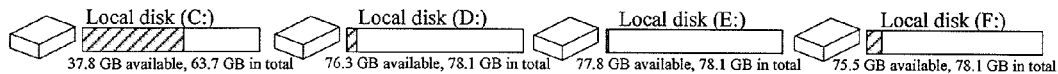
FIG. 1 is a diagram for displaying a storage device partition in the prior art.
Figure 2:
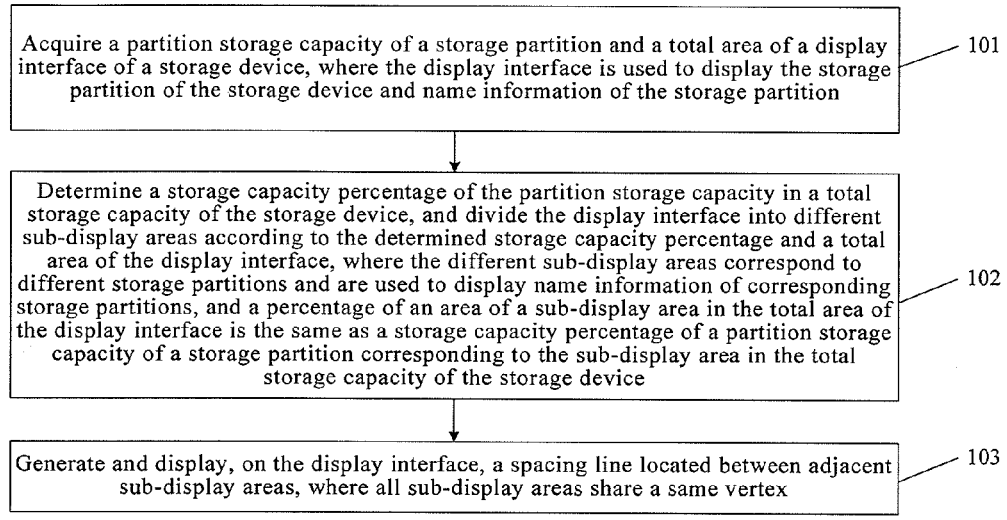
FIG. 2 is a flowchart of a method for displaying a storage device partition according to an embodiment of the present invention.

As shown in FIG. 2, the method includes:

Step 101: Acquire a partition storage capacity of a storage partition and a total area of a display interface of a storage device, where the display interface is used to display the storage partition of the storage device and name information of the storage partition.

First, information which is of a storage capacity of a storage device partition and is stored in the storage device and the total area of the display interface of the storage device are acquired, where the storage device generally refers to a device used to store information, and may be a hard disk, a floppy disk, a USB flash drive, a CD, a DVD, or the like, and the display interface is used to display the storage partition of the storage device and the name information of the storage partition, and may be a display area of a computer monitor, a display area of a display screen of a digital product, or the like, which is not limited in this embodiment of the present invention.

Step 102: Determine a storage capacity percentage of the partition storage capacity in a total storage capacity of the storage device, divide the display interface into different sub-display areas according to the determined storage capacity percentage and the total area of the display interface, where the different sub-display areas correspond to different storage partitions and are used to display name information of corresponding storage partitions, and divide the display interface into multiple sub-display areas according to the number of storage device partitions, where the number of sub-display areas is equal to the number of partitions, name information of a partition corresponding to a sub-display area is displayed in each sub-display area, and storage information (such as a file, a folder, a path of the folder in the corresponding partition) or attribute information (such as a capacity, available space, and used space of the corresponding partition) of the corresponding partition may also be displayed.

A percentage of an area of the sub-display area in the total area of the display interface is the same as a storage capacity percentage of a partition storage capacity of the storage partition corresponding to the sub-display area in the total storage capacity of the storage device. On the display interface, the area of the sub-display area corresponding to the partition is divided according to a percentage of the storage capacity of the partition in the storage capacity of the storage device. The larger a capacity of a partition is, relatively speaking, the larger a corresponding sub-display area is. For example, a storage device has four partitions, A, B, C, and D. Storage capacities of the partitions A, B, C, and D are 5%, 10%, 40%, and 45% of a capacity of the storage device respectively. Accordingly, a display interface is divided into four sub-display areas according to the percentages, where areas of sub-display areas of the partitions A, B, C, and D are 5%, 10%, 40%, and 45% of a total area of the display interface respectively. Therefore, a storage capacity of each partition is clear at a glance and user operations are facilitated.

Step 103: Generate and display, on the display interface, a spacing line located between adjacent sub-display areas, where all sub-display areas share a same vertex.

Figure 3:
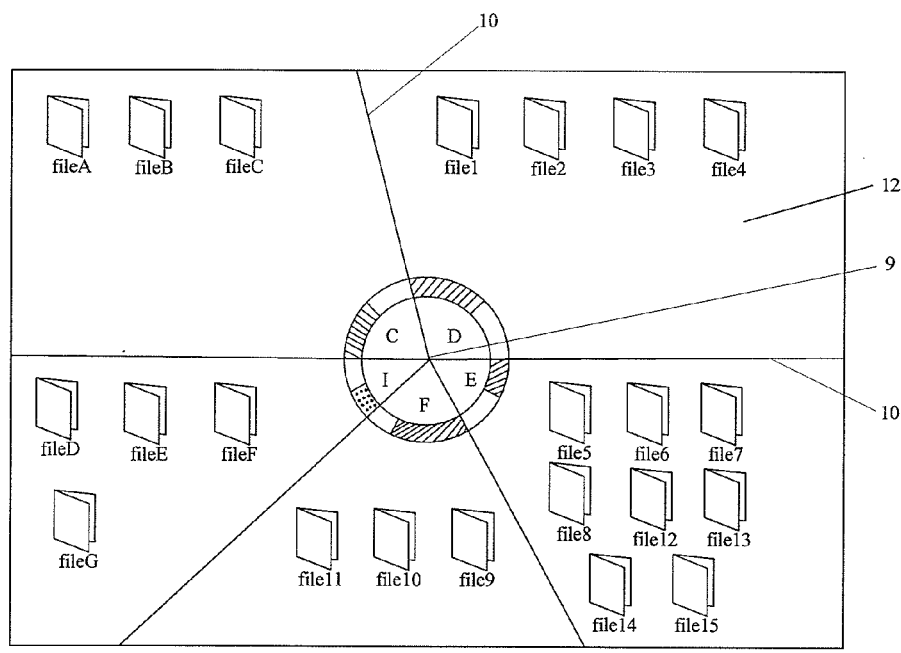
FIG. 3 is an effect drawing for displaying a storage device partition according to an embodiment of the present invention.

As shown in FIG. 3, a hard disk includes five sub-display areas, that is, C, D, E, F, and I, a spacing line 10 is displayed between adjacent sub-display areas 12, and spacing lines 10 of the five sub-display areas converge at a vertex 9, that is, the five sub-display areas share a same vertex 9.

According to the method for displaying a storage device partition provided in this embodiment of the present invention, a display interface is divided into several sub-display areas, and each sub-display area corresponds to one storage device partition and is used to independently display information of a corresponding partition, such as a name and a capacity, and a file, a folder, and the like in a partition root directory. As a result, space of the display interface is fully used, user operations are simplified, and user operations among storage partitions are facilitated. In addition, on the display interface, an area of a sub-display area corresponding to the partition is divided according to a percentage of the storage capacity of the partition in the storage capacity of the storage device. Therefore, the storage capacity of each partition is clear at a glance, user operations are facilitated, and user experience is improved.

Further, in this embodiment of the present invention, the method further includes:

acquiring the storage information stored in the storage partition, where the acquired storage information includes: information of a file, a folder, a path of the folder, and the like in the corresponding partition; and displaying the acquired storage information in the sub-display area corresponding to the storage partition, that is, displaying, in the sub-display area corresponding to the storage partition, the information of the file, the folder, the path of the folder, and the like in the storage partition.

In addition, in the sub-display area, according to command information input by a user to enter a certain folder, a file, a subfolder, and a path of the folder that are included in the folder are displayed in the corresponding sub-display area. In a sub-display area, if the user wants to enter any folder in a corresponding partition, the user may input command information to enter the folder (for example, in a mobile phone, the user selects an icon of the folder and performs a corresponding opening operation on the display interface). After receiving the command information, a background program queries a file directory in the corresponding partition according to the command information, acquires a file, a subfolder, and a path of the folder that are included in the folder, and performs a display in the corresponding sub-display area. In the sub-display area, the file (such as an executable file, an image file, and an audio file) and the subfolder that are in the folder are displayed. In this case, sub-display area division on the display interface is unchanged.

Further, in the method for displaying a storage device partition according to this embodiment of the present invention, according to command information input by the user to enter a layer directory in a path displayed in the sub-display area, a file and a subfolder that are included in the layer directory and a path of the layer directory are displayed in the corresponding sub-display area. After the user inputs a command to enter a certain folder in a partition, a path of the folder is displayed in a corresponding sub-display area. In this case, the user may choose to enter any layer directory in the displayed path of the folder. After the user inputs corresponding command information, a file and a subfolder that are included in a layer directory that the user chooses to enter are displayed in the sub-display area, thereby improving convenience of user operations.

Further, in the method for displaying a storage device partition in this embodiment of the present invention, according to command information input by the user to enter the partition, the sub-display area corresponding to the partition may be displayed in a full screen manner on the display interface. When the user needs to further perform an operation on a partition, the user may input corresponding command information, so that content in a sub-display area corresponding to the partition is displayed in a full screen manner on the display interface, that is, the display interface is no longer divided into sub-display areas but an entire sub-display area is used to display a file, a folder, and a path that are in the partition, thereby facilitating user viewing.

Alternatively, in this embodiment of the present invention, the method further includes:

acquiring attribute information of the storage partition, where the attribute information of the storage partition includes a storage capacity, a used storage capacity, and an available storage capacity of the partition; and displaying the acquired attribute information of the storage partition in the sub-display area corresponding to the storage partition.

Alternatively, the displaying the acquired attribute information of the storage partition in the sub-display area corresponding to the storage partition specifically includes: displaying the attribute information of the partition in a character manner, a visual graphical element manner, or a combination of a character manner and a visual graphical element manner. A visual graphical element may be a pattern with a specific style, where the specific style includes a color, a shape, a size, a fill, and the like of the pattern. Further, a name of the storage partition and the partition storage capacity may be displayed in a character manner, and the used storage capacity and the available storage capacity may be displayed in a graphical manner.

Figure 4:
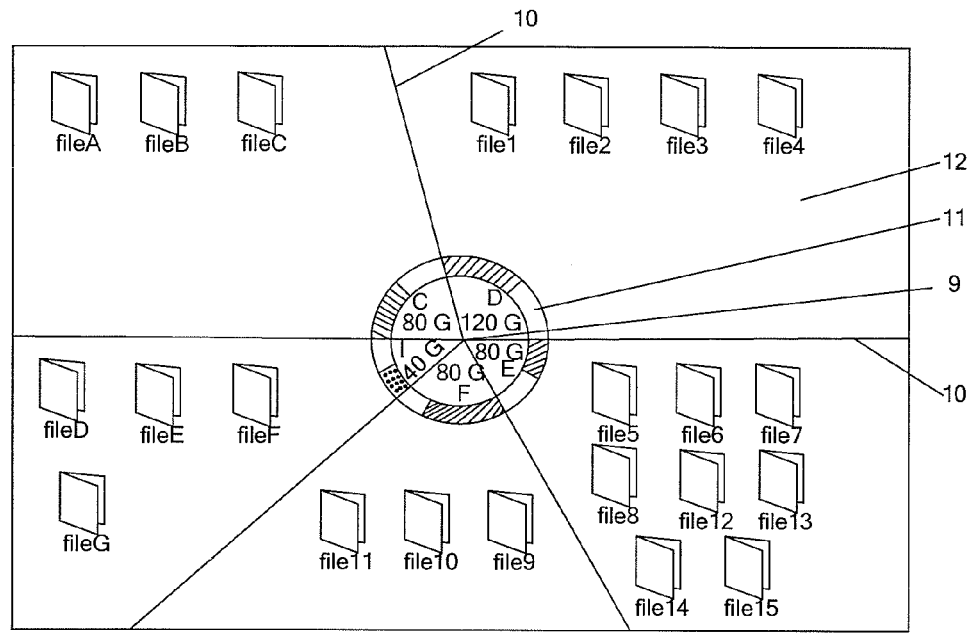
FIG. 4 is an effect drawing for displaying attribute information of a storage device partition according to an embodiment of the present invention.

For example, as shown in FIG. 4, a first sector ring 11 is generated in the sub-display area by using the vertex 9 as the center of a circle, the spacing lines 10 between the adjacent sub-display areas 12 as start and end points, and a preset first radius length and a second radius length that is greater than the first radius length, where a total area of the first sector ring 11 represents a sum of the used storage capacity and the available storage capacity, and a visual element is filled in the first sector ring 11 that represents the used storage capacity or the available storage capacity, so as to distinguish the used storage capacity from the available storage capacity. For example, a filled portion in the first sector ring 11 in the figure indicates the used storage capacity of the storage partition corresponding to the sub-display area, and an unfilled portion indicates the available storage capacity of the storage partition corresponding to the sub-display area. And meanwhile, names (C, D, E, F, and I as shown in the figure) and total storage capacities (80 G, 120 G, 80 G, 80 G, and 40 G as shown in the figure) of the storage device partitions are displayed in a sector area enclosed by the first sector ring 11 and spacing lines 10 on its both sides respectively. With the preceding display method, the total storage capacity, the available storage capacity, and the used storage capacity of the storage device may be intuitively displayed. In this way, a user can conveniently know a storage capacity condition of the storage device, and user experience is improved.

Further, in this embodiment of the present invention, the method further includes:

displaying a path index of storage information by using the following method: generating an $N^{th}$ arc boundary in the sub-display area by using the vertex as the center of a circle, the spacing lines between the adjacent sub-display areas as start and end points, and a preset $N^{th}$ radius length, where because the first radius length and the second radius length are used to form the first sector ring, N is greater than or equal to three, and the $N^{th}$ radius length is greater than the second radius length or an $(N-1)^{th}$ radius length, so as to form an $(N-1)^{th}$ sector ring between the $N^{th}$ arc boundary and the first sector ring or an $(N-2)^{th}$ sector ring, where the $(N-1)^{th}$ sector ring is used to present the path index of the storage information stored in the storage partition.

Figure 5:
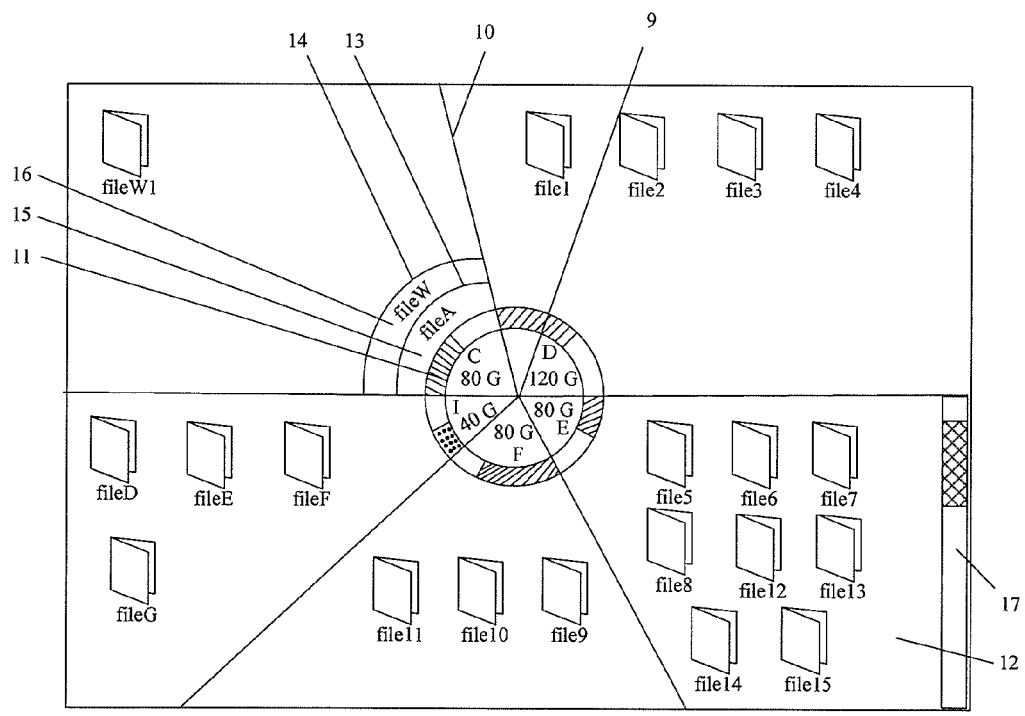
FIG. 5 is an effect drawing for displaying a partition path of a storage device according to an embodiment of the present invention.

For example, as shown in FIG. 5, a path index of a file fileW1 in a storage partition C is storage partition C-folder fileA-folder fileW-file fileW1, and its display method is: because the path index of the file fileW1 in the storage partition C is a two-level path index, another two sector rings need to be formed outside the first sector ring 11 and N is equal to four, generating a third arc boundary 13 in the sub-display area by using the vertex 9 as the center of a circle, the spacing lines 10 between the adjacent sub-display areas as start and end points, and a preset third radius length, and generating a fourth arc boundary 14 in the sub-display area by using a preset fourth radius length, where the fourth radius length is greater than the third radius length, the third radius length is greater than the second radius length, a second sector ring 15 is formed between the third arc boundary and the first sector ring, and a third sector ring 16 is formed between the fourth arc boundary and the second sector ring 15. The second sector ring 15 is used to present the first-level path folder fileA in the path index of the file fileW1, and the third sector ring 16 is used to present the second-level path folder fileW in the path index of the file fileW1. This display method facilitates switching operations for the user in a multi-level path index and is convenient and elegant.

Alternatively, in this embodiment of the present invention, the method further includes:

generating a scroll bar in at least one sub-display area, where the scroll bar is used to choose storage information displayed in the at least one sub-display area, the storage information is stored in a storage partition corresponding to the at least one sub-display area, and the storage information specifically is multiple folders. When the sub-display area cannot simultaneously display all files and folders in a layer directory of a partition corresponding to the sub-display area, the scroll bar is provided in the sub-display area, and is used to adjust a workspace displayed by the sub-display area, so that the user can conveniently view all files and folders in the layer directory. For example, as shown in FIG. 5, files and folders in a sub-display area 12 are displayed by using icons in the sub-display area, while the sub-display area is not large enough to display all icons. In this case, a scroll bar 17 is displayed in the sub-display area, and the user may operate the scroll bar to adjust a workspace (that is, an area where the icons of all files and folders in the sub-display area 12 are displayed) displayed by the sub-display area 12. According to a length of the scroll bar, the user may further intuitively determine the number of files and folders in the layer directory, thereby facilitating user scanning.

Further, according to the method for displaying a storage device partition provided in this embodiment of the present invention, partition information of multiple storage devices may be displayed:

acquiring partition storage capacities of storage partitions of multiple storage devices, where an electronic device that applies the method for displaying a storage device partition in the present invention includes multiple storage devices, or the electronic device is connected to an external portable storage device; and then, determining storage capacity percentages of the partition storage capacities in a total storage capacity of the multiple storage devices, and dividing a display interface into different sub-display areas according to the determined storage capacity percentages and a total area of the display interface, where visual graphical elements of sub-display areas corresponding to the partitions of different storage devices are different. For example, the electronic device includes a built-in storage device A and an external storage device B. On the display interface, patterns of partition attribute information in sub-display areas corresponding to all partitions of the storage device A are red, and patterns of partition attribute information in sub-display areas corresponding to all partitions of the storage device B are green.

Alternatively, in this case, backgrounds are displayed in the sub-display areas, and the backgrounds in the sub-display areas corresponding to the partitions of different storage devices are different. For example, the electronic device is disposed with a storage device C and a storage device D. On a display interface, backgrounds in sub-display areas corresponding to all partitions of the storage device C are white, while backgrounds in sub-display areas of all partitions of the storage device D are black.

By adopting the preceding method for distinguishing different storage devices by using a visual graphical element, the user can intuitively distinguish different storage devices and conveniently perform operations among different storage devices, and user experience is improved.

Further, the method for displaying storage information provided in this embodiment of the present invention further includes: displaying, according to command information input by the user to enter the partition and in a full screen manner, the sub-display area corresponding to the partition on the display interface. When the user needs to further perform an operation on a partition, the user may input corresponding command information, so that content in a sub-display area corresponding to the partition is displayed on the display interface in a full screen manner, that is, the display interface is no longer divided into sub-display areas but an entire sub-display area is used to display a file, a folder, and a path that are in the partition, thereby facilitating user viewing.

According to the method for displaying a storage device partition provided in this embodiment of the present invention, a display interface is divided into several sub-display areas, each sub-display area displays attribute information and storage information of a corresponding partition, and attribute information and path index information of a storage partition are displayed intuitively by using a character and a visual graphical element. In this way, a user may perform an operation in a sub-display area of a certain partition, and view storage information of a corresponding partition and a file and a folder that are stored in each level of storage directory. A sub-display area of each partition is displayed independently and does not affect each other. As a result, space of the display interface is fully used, user operations are simplified, user operations among partitions are facilitated, and user experience is improved.

Figure 6:
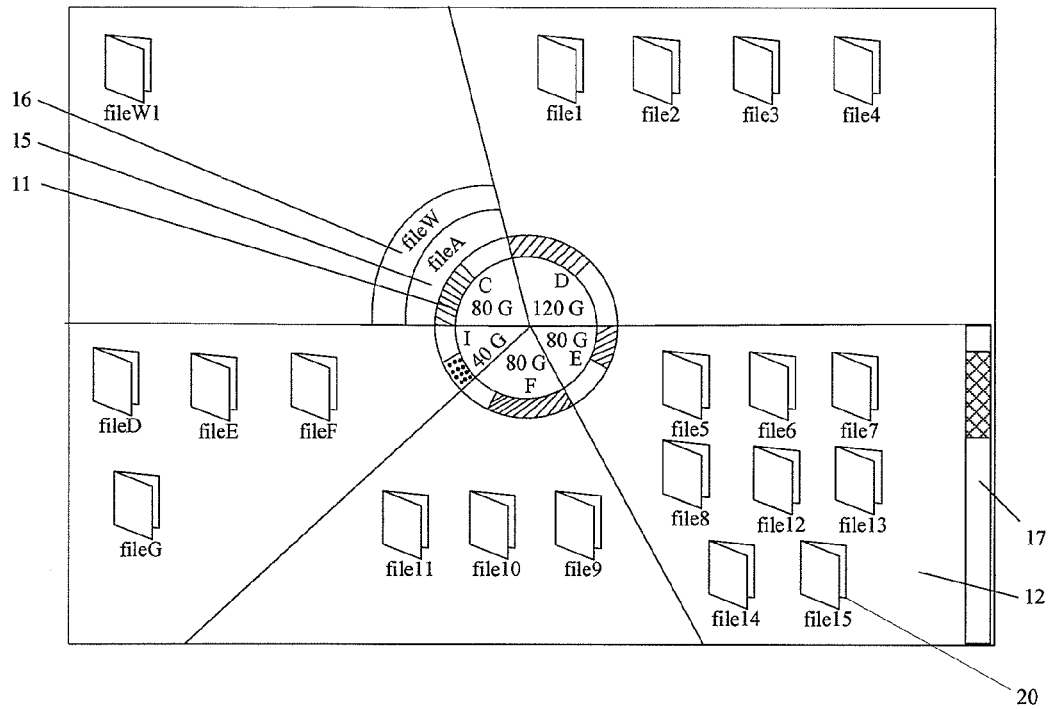
FIG. 6 is an overall effect drawing for displaying a storage device partition according to an embodiment of the present invention.

To further describe the method for displaying a storage device partition provided in this embodiment of the present invention, descriptions are provided in the following with reference to a specific example:

An embodiment of the present invention provides a method for displaying a storage device partition. The method is applied to a computer, and the computer has a built-in hard disk and is connected to an external USB flash drive. The method includes:

dividing, according to partition information of the hard disk in the computer and the USB flash drive, a display interface of the computer into sub-display areas corresponding to hard disk partitions and a USB flash drive partition. As shown in FIG. 6, the hard disk includes four partitions, C, D, E, and F, and the USB flash drive includes only one partition I. Capacities of the partitions C, D, E, F, and I are 80 G, 120 G, 80 G, 80 G, and 40 G respectively. The display interface is divided into five parts according to a percentage of each partition in a sum of capacities of the hard disk and the USB flash drive. A sub-display area corresponding to each of the partition C, the partition E, and the partition F occupies 20% of a size of the display interface, a sub-display area corresponding to the partition D occupies 30% of the size of the display interface, and a sub-display area corresponding to the partition I occupies 10% of the size of the display interface.

Attribute information of a partition corresponding to each sub-display area 12 and a file and folder 20 in the partition are displayed in each sub-display area 12, that is, a name, a capacity, available space, and used space of the partition C, D, E, F, or I are displayed in a sub-display area 12 corresponding to each partition.

In this embodiment of the present invention, a display interface is divided into five sector sub-display areas 12, and each sub-display area 12 corresponds to one partition. A capacity, available space, and used space of a partition are displayed by using a character and a visual graphical element, that is, a first sector ring 11 located at the sector center of the sub-display area 12 represents a total capacity of the partition, where a colored portion represents used space of a corresponding partition, and a uncolored portion represents available space of the corresponding partition. The name and the total capacity of the corresponding partition are marked in space enclosed by the first sector ring 11. A file and folder 20 in a root directory of the corresponding partition is displayed in the sub-display area 12. In addition, the partitions C, D, E, and F are the partitions of the hard disk, and the partition I is the partition of the USE flash drive. Therefore, the color of the colored portion in the first sector ring 11 of the partition C, D, E, or F is different from the color of the colored portion in the first sector ring 11 of the partition I for distinguishing, storage information of each partition is clear at a glance, and operations are facilitated. In addition, there are many files and folders in a root directory of the partition E. As a result, the sub-display area of the partition E cannot display all files and folders. In this case, a scroll bar 17 is provided in the partition E and is used to adjust a display workspace in the sub-display area of the partition E, so that a user can conveniently view all files and folders in the partition E.

Further, according to command information input by the user to enter a folder in any partition, that is, the user uses a mouse of the computer to click an icon of the folder, a file and a subfolder that are included in the folder and a path of the folder are displayed in a corresponding sub-display area. When the user enters a folder file in a folder fileA in a root directory of the partition C, a file and a subfolder (a folder file1 in the figure) that are in the folder fileW are displayed in the sub-display area of the partition C. In addition, a path of the folder fileW is displayed by using a sector ring outwards level by level outside the first sector ring 11 in the sector area, that is, the path folder fileA is displayed by using a second sector ring 15 and the path folder file is displayed by using a third sector ring 16.

When the file and the subfolder that are in the folder fileW are displayed in the sub-display area, the user can click the second sector ring 15 in the sub-display area of the partition C by using the mouse if the user wants to enter the folder fileA in the path of the folder fileW. In this case, a file and a subfolder that are in the folder fileA are displayed in the sub-display area.

According to the method for displaying a storage device partition provided in this embodiment of the present invention, a display interface is divided into several sub-display areas, each sub-display area displays attribute information and storage information of a corresponding partition, and attribute information and path index information of a storage partition are displayed intuitively by using a character and a visual graphical element. In this way, a user may perform an operation in a sub-display area of a certain partition, and view storage information of a corresponding partition and a file and a folder that are stored in each level of storage directory. A sub-display area of each partition is displayed independently and does not affect each other. As a result, space of the display interface is fully used, user operations are simplified, user operations among partitions are facilitated, and user experience is improved.

Figure 7:
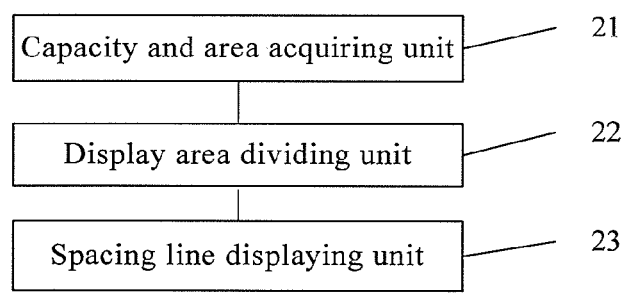
FIG. 7 is a schematic diagram of an apparatus for displaying a storage device partition according to an embodiment of the present invention.

An embodiment of the present invention further provides an apparatus for displaying a storage device partition. As shown in FIG. 7, the apparatus includes:

a capacity and area acquiring unit 21, configured to acquire a partition storage capacity of a storage partition and a total area of a display interface of a storage device, where the display interface is used to display the storage partition of the storage device and name information of the storage partition;

a display area dividing unit 22, configured to determine a storage capacity percentage of the partition storage capacity in a total storage capacity of the storage device, and divide the display interface into different sub-display areas according to the determined storage capacity percentage and a total area of the display interface, where the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and a spacing line displaying unit 23, configured to generate and display, on the display interface, a spacing line located between adjacent sub-display areas, where all sub-display areas share a same vertex.

Further, in this embodiment of the present invention, the apparatus further includes:

a storage information acquiring unit, configured to acquire storage information stored in the storage partition; and a storage information displaying unit, configured to display the acquired storage information in a sub-display area corresponding to the storage partition.

Further, in this embodiment of the present invention, the apparatus further includes:

an attribute information acquiring unit, configured to acquire attribute information of the storage partition, where the attribute information of the storage partition includes a storage capacity, a used storage capacity, and an available storage capacity of the partition; and an attribute information displaying unit, configured to display the acquired attribute information of the storage partition in the sub-display area corresponding to the storage partition.

Alternatively, in this embodiment of the present invention, the attribute information displaying unit includes:

a first attribute information displaying module, configured to display the attribute information of the partition in a character manner, a visual graphical element manner, or a combination of a character manner and a visual graphical element manner.

Alternatively, in this embodiment of the present invention, the attribute information displaying unit includes:

a second attribute information displaying module, configured to display a name of the storage partition and the partition storage capacity in a character manner, and display the used storage capacity and the available storage capacity in a graphical manner.

Further, in this embodiment of the present invention, the second attribute information displaying module includes:

a sector ring displaying module, configured to generate a first sector ring in the sub-display area by using the vertex as the center of a circle, spacing lines between adjacent storage partitions as start and end points, and a preset first radius length and a second radius length that is greater than the first radius length, where a total area of the first sector ring represents a sum of the used storage capacity and the available storage capacity, and a visual element is filled in the first sector ring that represents the used storage capacity or the available storage capacity, so as to distinguish the used storage capacity from the available storage capacity.

Further, in this embodiment of the present invention, the apparatus further includes:

a path index displaying unit, configured to generate an $N^{th}$ arc boundary in the sub-display area by using the vertex as the center of a circle, the spacing lines between the adjacent storage partitions as start and end points, and a preset $N^{th}$ radius length, where N is greater than or equal to three, the $N^{th}$ radius length is greater than the second radius length or an $(N-1)^{th}$ radius length, so that an $(N-1)^{th}$ sector ring is formed between the $N^{th}$ arc boundary and the first sector ring or an $(N-2)^{th}$ sector ring, and the $(N-1)^{th}$ sector ring is used to present a path index of the storage information stored in the storage partition.

Further, in this embodiment of the present invention, the apparatus further includes:

a scroll bar displaying unit, configured to generate a scroll bar in at least one sub-display area, where the scroll bar is used to choose storage information displayed in the at least one sub-display area, the storage information is stored in a storage partition corresponding to the at least one sub-display area, and the storage information specifically is multiple folders.

According to the apparatus for displaying a storage device partition provided in this embodiment of the present invention, a display interface is divided into several sub-display areas, each sub-display area displays attribute information and storage information of a corresponding partition, and attribute information and path index information of a storage partition are displayed intuitively by using a character and a visual graphical element. In this way, a user may perform an operation in a sub-display area of a partition of a certain storage device, and view storage information of a corresponding partition and a file and a folder that are stored in each level of storage directory. A sub-display area of each partition is displayed independently and does not affect each other. As a result, space of the display interface is fully used, user operations are simplified, user operations among partitions of the storage device are facilitated, and user experience is improved.

Figure 8:
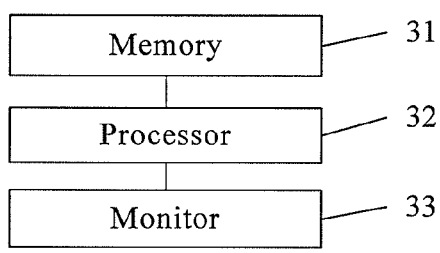
FIG. 8 is a schematic diagram of a terminal according to an embodiment of the present invention.

An embodiment of the present invention further provides a terminal. As shown in FIG. 8, the terminal includes a memory 31, a processor 32, and a monitor 33.

The processor 32 is configured to: acquire a partition storage capacity of a storage partition and a total area of a display interface of a storage device, where the display interface is used to display the storage partition of the storage device and name information of the storage partition;

determine a storage capacity percentage of the partition storage capacity in a total storage capacity of the storage device, and divide the display interface into different sub-display areas according to the determined storage capacity percentage and a total area of the display interface, where the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and generate and display, on the display interface, a spacing line located between adjacent sub-display areas, where all sub-display areas share a same vertex.

Further, the processor 32 is further configured to acquire storage information stored in the storage partition; and display the acquired storage information in a sub-display area corresponding to the storage partition.

Further, the processor 32 is further configured to acquire attribute information of the storage partition, where the attribute information of the storage partition includes a storage capacity, a used storage capacity, and an available storage capacity of the partition; and display the acquired attribute information of the storage partition in the sub-display area corresponding to the storage partition.

Further, the displaying the acquired attribute information of the storage partition in the sub-display area corresponding to the storage partition specifically includes: displaying the attribute information of the partition in a character manner, a visual graphical element manner, or a combination of a character manner and a visual graphical element manner.

Further, the displaying the acquired attribute information of the storage partition in the sub-display area corresponding to the storage partition specifically includes: displaying a name of the storage partition and the partition storage capacity in a character manner, and displaying the used storage capacity and the available storage capacity in a graphical manner.

Alternatively, the displaying the used storage capacity and the available storage capacity in a graphical manner specifically includes:

generating a first sector ring in the sub-display area by using the vertex as the center of a circle, spacing lines between adjacent sub-display areas as start and end points, and a preset first radius length and a second radius length that is greater than the first radius length, where a total area of the first sector ring represents a sum of the used storage capacity and the available storage capacity, and a visual element is filled in the first sector ring that represents the used storage capacity or the available storage capacity, so as to distinguish the used storage capacity from the available storage capacity.

Alternatively, the processor 32 is further configured to: generate an $N^{th}$ arc boundary in the sub-display area by using the vertex as the center of a circle, the spacing lines between the adjacent sub-display areas as start and end points, and a preset $N^{th}$ radius length, where N is greater than or equal to three, the $N^{th}$ radius length is greater than the second radius length or an $(N-1)^{th}$ radius length, so that an $(N-1)^{th}$ sector ring is formed between the $N^{th}$ arc boundary and the first sector ring or an $(N-2)^{th}$ sector ring, and the $(N-1)^{th}$ sector ring is used to present a path index of the storage information stored in the storage partition.

Alternatively, the processor 32 is further configured to generate a scroll bar in at least one sub-display area, where the scroll bar is used to choose storage information displayed in the at least one sub-display area, the storage information is stored in a storage partition corresponding to the at least one sub-display area, and the storage information specifically is multiple folders.

The memory 31 is configured to store the partition storage capacity of the storage partition and the total area of the display interface of the storage device, the storage capacity percentage of the partition storage capacity in the total storage capacity of the storage device, and the percentage of the area of the sub-display area in the total area of the display interface.

Further, the memory 31 is further configured to store the storage information in the storage partition and the attribute information of the storage partition.

The monitor 33 is configured to display, on the display interface, sub-display areas corresponding to different storage partitions, where the percentage of the area of the sub-display area in the total area of the display interface is the same as a storage capacity percentage of a partition storage capacity of a storage partition corresponding to the sub-display area in the total storage capacity of the storage device, and display the spacing line located between the adjacent sub-display areas, where all sub-display areas share a same vertex.

Further, the monitor 33 is further configured to display the acquired storage information in the sub-display area corresponding to the storage partition, and display the acquired attribute information of the storage partition in the sub-display area corresponding to the storage partition.

Alternatively, the monitor 33 is further configured to display the attribute information of the partition in a character manner, a visual graphical element manner, or a combination of a character manner and a visual graphical element manner.

Alternatively, the monitor 33 is further configured to display a name of the storage partition and the partition storage capacity in a character manner, and display the used storage capacity and the available storage capacity in a graphical manner.

Alternatively, the monitor 33 is further configured to display the first sector ring and the $(N-1)^{th}$ sector ring.

Alternatively, the monitor 33 is further configured to display the scroll bar.

According to the terminal provided in this embodiment of the present invention, a display interface is divided into several sub-display areas, each sub-display area displays attribute information and storage information of a corresponding partition, and attribute information and path index information of a storage partition are displayed intuitively by using a character and a visual graphical element. In this way, a user may perform an operation in a sub-display area of a partition of a certain storage device, and view storage information of a corresponding partition and a file and a folder that are stored in each level of storage directory. A sub-display area of each partition is displayed independently and does not affect each other. As a result, space of the display interface is fully used, user operations are simplified, user operations among partitions of the storage device are facilitated, and user experience is improved.

In a case that no conflict exists, technical features in the embodiments of the present invention may be freely combined for use.

Through the foregoing description of the implementation manners, a person skilled in the art may clearly understand that the present invention may be implemented by software plus necessary universal hardware, and definitely, may also be implemented by hardware, but in many cases, the former one is a better implementation manner. Based on such understanding, the technical solutions of the present invention essentially, or the part contributing to the prior art may be embodied in a form of a software product. The computer software product is stored in a readable storage medium, for example, a floppy disk, a hard disk, or an optical disk of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for displaying a storage device partition, the method comprising:
   acquiring a partition storage capacity of a storage partition and a total area of a display interface of a storage device, wherein the display interface is used to display the storage partition of the storage device and name information of the storage partition;
   determining a storage capacity percentage of the partition storage capacity in a total storage capacity of the storage device, and dividing the display interface into different sub-display areas according to the determined storage capacity percentage and a total area of the display interface, wherein the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and
   generating and displaying, on the display interface, a spacing line located between adjacent sub-display areas, wherein all sub-display areas share a same vertex.

2. The method according to claim 1, further comprising:
   acquiring storage information stored in the storage partition; and
   displaying the acquired storage information in a sub-display area corresponding to the storage partition.

3. The method according to claim 1, further comprising:
   acquiring attribute information of the storage partition, wherein the attribute information of the storage partition comprises a storage capacity, a used storage capacity, and an available storage capacity of the partition; and
   displaying the acquired attribute information of the storage partition in the sub-display area corresponding to the storage partition.

4. The method according to claim 3, wherein displaying the acquired attribute information of the storage partition in the sub-display area corresponding to the storage partition comprises: displaying the attribute information of the partition in a character manner, a visual graphical element manner, or a combination of a character manner and a visual graphical element manner.

5. The method according to claim 3, wherein displaying the acquired attribute information of the storage partition in the sub-display area corresponding to the storage partition comprises: displaying a name of the storage partition and the partition storage capacity in a character manner, and displaying the used storage capacity and the available storage capacity in a graphical manner.

6. The method according to claim 5, wherein displaying the used storage capacity and the available storage capacity in a graphical manner comprises:
   generating a first sector ring in the sub-display area by using the vertex as the center of a circle, spacing lines between adjacent sub-display areas as start and end points, and a preset first radius length and a second radius length that is greater than the first radius length, wherein a total area of the first sector ring represents a sum of the used storage capacity and the available storage capacity, and a visual element is filled in the first sector ring that represents the used storage capacity or the available storage capacity, so as to distinguish the used storage capacity from the available storage capacity.

7. The method according to claim 6, further comprising:
   generating an $N^{th}$ arc boundary in the sub-display area by using the vertex as the center of a circle, the spacing lines between the adjacent sub-display areas as start and end points, and a preset $N^{th}$ radius length, wherein N is greater than or equal to three, the $N^{th}$ radius length is greater than the second radius length or an $(N-1)$th radius length, so that an $(N-1)^{th}$ sector ring is formed between the $N^{th}$ arc boundary and the first sector ring or an $(N-2)^{th}$ sector ring, and the $(N-1)^{th}$ sector ring is used to present a path index of the storage information stored in the storage partition.

8. The method according to claim 2, further comprising:
   generating a scroll bar in at least one sub-display area, wherein the scroll bar is used to choose storage information displayed in the at least one sub-display area, the storage information is stored in a storage partition corresponding to the at least one sub-display area, and the storage information specifically is multiple folders.

9. An apparatus for displaying a storage device partition, the apparatus comprising:
   a capacity and area acquiring unit, configured to acquire a partition storage capacity of a storage partition and a total area of a display interface of a storage device, wherein the display interface is used to display the storage partition of the storage device and name information of the storage partition;
   a display area dividing unit, configured to determine a storage capacity percentage of the partition storage capacity in a total storage capacity of the storage device, and divide the display interface into different sub-display areas according to the determined storage capacity percentage and a total area of the display interface, wherein the different sub-display areas correspond to different storage partitions and are used to display name information of corresponding storage partitions, and a percentage of an area of a sub-display area in the total area of the display interface is the same as a storage capacity percentage of a partition storage capacity of a storage partition corresponding to the sub-display area in the total storage capacity of the storage device; and a spacing line displaying unit, configured to generate and display, on the display interface, a spacing line located between adjacent sub-display areas, wherein all sub-display areas share a same vertex.

10. The apparatus according to claim 9, further comprising:

a storage information acquiring unit, configured to acquire storage information stored in the storage partition; and a storage information displaying unit, configured to display the acquired storage information in a sub-display area corresponding to the storage partition.

11. The apparatus according to claim 9, further comprising:

an attribute information acquiring unit, configured to acquire attribute information of the storage partition, wherein the attribute information of the storage partition comprises a storage capacity, a used storage capacity, and an available storage capacity of the partition; and an attribute information displaying unit, configured to display the acquired attribute information of the storage partition in the sub-display area corresponding to the storage partition.

12. The apparatus according to claim 11, wherein the attribute information displaying unit comprises:

a first attribute information displaying module, configured to display the attribute information of the partition in a character manner, a visual graphical element manner, or a combination of a character manner and a visual graphical element manner.

13. The apparatus according to claim 11, wherein the attribute information displaying unit comprises:

a second attribute information displaying module, configured to display a name of the storage partition and the partition storage capacity in a character manner, and display the used storage capacity and the available storage capacity in a graphical manner.

14. The apparatus according to claim 13, wherein the second attribute information displaying module comprises:

a sector ring displaying module, configured to generate a first sector ring in the sub-display area by using the vertex as the center of a circle, spacing lines between adjacent storage partitions as start and end points, and a preset first radius length and a second radius length that is greater than the first radius length, wherein a total area of the first sector ring represents a sum of the used storage capacity and the available storage capacity, and a visual element is filled in the first sector ring that represents the used storage capacity or the available storage capacity, so as to distinguish the used storage capacity from the available storage capacity.

15. The apparatus according to claim 14, further comprising:

a path index displaying unit, configured to generate an $N^{th}$ arc boundary in the sub-display area by using the vertex as the center of a circle, the spacing lines between the adjacent storage partitions as start and end points, and a preset $N^{th}$ radius length, wherein N is greater than or equal to three, the $N^{th}$ radius length is greater than the second radius length or an $(N-1)^{th}$ radius length, so that an $(N-1)^{th}$ sector ring is formed between the $N^{th}$ arc boundary and the first sector ring or an $(N-2)^{th}$ sector ring, and the $(N-1)^{th}$ sector ring is used to present a path index of the storage information stored in the storage partition.

16. The apparatus according to claim 10, further comprising:

a scroll bar displaying unit, configured to generate a scroll bar in at least one sub-display area, wherein the scroll bar is used to choose storage information displayed in the at least one sub-display area, the storage information is stored in a storage partition corresponding to the at least one sub-display area, and the storage information is multiple folders.

* * * * *